Jan. 19, 1932.                F. MAINES                1,841,619
                            DRAFT CONNECTION
                            Filed May 18, 1929
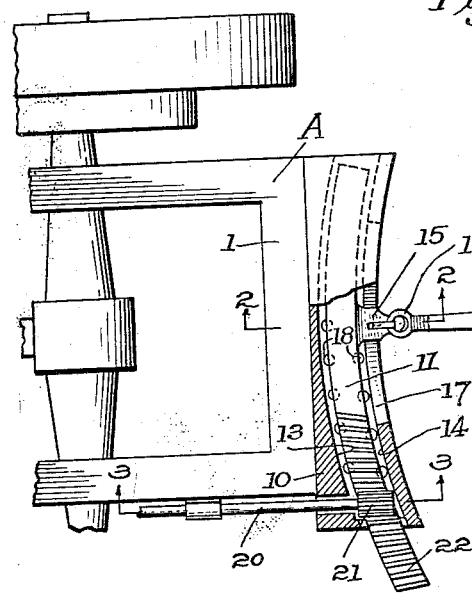
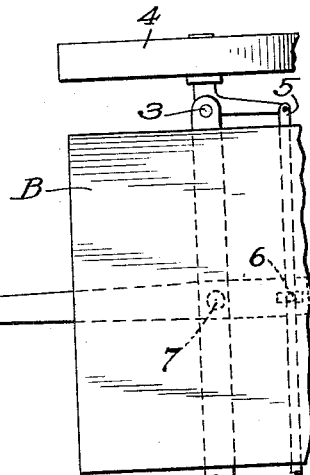
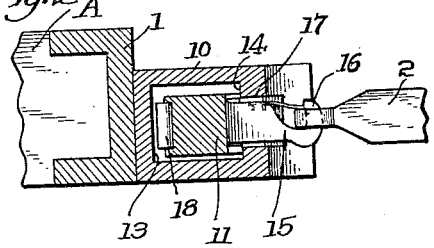
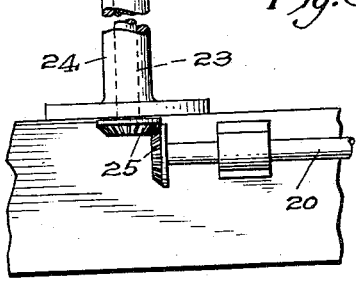
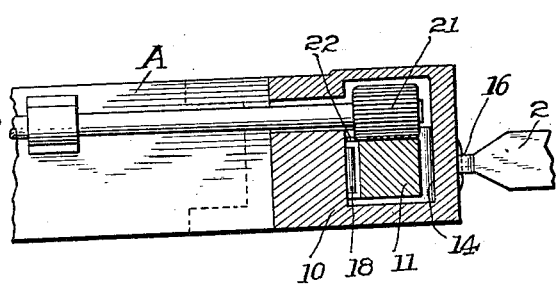
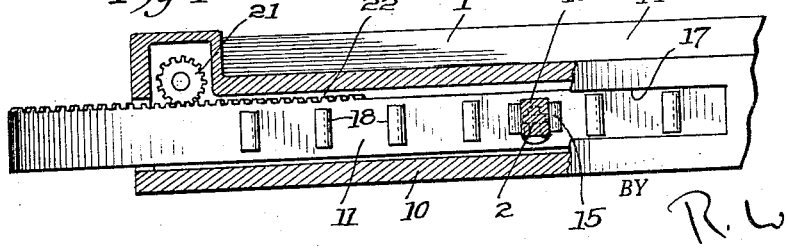
INVENTOR.
Fred Maines,
BY
ATTORNEY.

Patented Jan. 19, 1932

1,841,619

UNITED STATES PATENT OFFICE

FRED MAINES, OF TAFT, CALIFORNIA

DRAFT CONNECTION

Application filed May 18, 1929. Serial No. 364,130.

This invention is a draft connection adapted for use between a trailer vehicle and a draft vehicle such as a tractor or motor truck; and it is the object of the invention to provide for accurately steering the trailer when the draft vehicle is either propelled forward or is being backed.

It is a further object of the invention to provide for steering the trailer without reducing its longitudinal spacing from the draft vehicle as a consequence of arcuate steering movement of the trailer tongue, thereby providing for steering movement without increasing the hauling strain imposed by the trailer load; and this compensation for arcuate swinging of the trailer tongue is obtained by an extremely simple but practical construction which provides a sturdy draft connection irrespective of the arcuate shifting of the steering tongue.

It is a still further object of the invention to provide for manually controlling the arcuate swinging of the trailer tongue so as to insure any desired steering movement, with the draft connection arranged whereby the hauling strain of the trailer load will tend to readily releasably lock the arcuately shiftable steering connection at any desired adjusted position.

Further objects of the invention will be readily understood from the following description of the accompanying drawings, in which:

Fig. 1 is a plan view of the invention, partly in horizontal section.

Figs. 2 and 3 are vertical sections on the lines 2—2 and 3—3 respectively of Fig. 1.

Fig. 4 is a rear elevation of the invention, partly in vertical section.

The improved draft connection is illustrated as employed between a usual draft vehicle such as a motor truck A, and a usual trailer vehicle shown at B. The trailer is provided with a forwardly projecting tongue 2 pivoted to the trailer so as to form a steering connection which in the present instance is shown as including steering knuckles 3 for the front wheels 4 of the trailer, with said front wheels connected by a transverse steering rod 5 which is laterally shifted through an operating connection 6 at the rear end of the tongue 2 which is intermediately pivoted to the trailer as shown at 7. The improved draft connection is provided between the forward end of tongue 2 and the chassis of the truck A, with said draft connection adapted for lateral shifting with relation to the truck chassis so as to swing the tongue 2 and thereby steer the trailer B.

As an instance of such draft connection a transverse arcuate guide 10 is suitably fixed to the rear transverse frame 1 of the truck chassis, and a concentric arcuate draft head 11 is adapted to slide in the arcuate guide and is suitably connected to the forward end of tongue 2, with the arc of the draft connection of a radius with relation to any predetermined length of tongue 2 whereby said arc is concentric with the pivotal mounting 7 for the tongue. The head 11 is thus adapted for lateral shifting for steering the trailer without changing the longitudinal spacing between the trailer and truck.

The guide 10 is preferably a casing extending completely around the head 11 as shown in Fig. 2, and has arcuate abutment walls 13—14 adapted for respective engagement by the front and rear surfaces of the draft head 11 so as to provide a draft connection when the truck is either propelled forward or is being backed. The connection between the shiftable draft head and the tongue 2 is shown as a bar 15 projecting rearwardly from the draft head 11 medially of its length and preferably adapted for detachable engagement with the tongue as shown at 16, with the rear abutment wall 14 of the arcuate guide casing suitably slotted as shown at 17 so as to provide for said rearward projection of bar 15 while permitting free lateral shifting of the draft head in its guide to the limits defined by the length of slot 17. Antifriction means shown as roller bearings 18 may be provided between both the front and rear surfaces of head 11 and the cooperating abutment walls 13—14 of the arcuate guide casing in order that the draft head may be readily laterally shifted in its guide irrespective of the strain imposed upon the draft head by the weight of the trailer load.

The draft head 11 is adapted for manual shifting in its arcuate guide 10 so as to steer the trailer B by the corresponding swinging movement of tongue 2, and the strain of the trailer load is adapted to readily releasably hold the draft head at any desired adjustment so as to relieve the manual control of excessive strain. For this purpose a shaft 20 may be mounted on the side of the truck chassis A so as to project into the guide casing 10 above the draft head 11, and a pinion 21 on the shaft 20 meshes with a corresponding rack 22 on the upper face of the draft head, so that rotation of shaft 20 will correspondingly arcuately shift the draft head in its guide.

The shaft 20 may be rotated by a manual control positioned adjacent the driver's seat of the truck, the said control being shown as a vertical shaft 23 rotatable in a stationary bearing pedestal 24, with a bevel gear driving connection 25 provided between the shafts 20—23, and a hand wheel 26 on the shaft 23 adapted for readily releasable locking in rotatably adjusted position, as for example by a spring pressed latch 27 on the hand wheel adapted for frictional engagement in cooperating notches 27ª in the stationary bearing 24.

In operation, when the draft vehicle is propelled forward or is being backed, the hauling strain of the trailer load is transmitted through draft head 11 to one or the other of arcuate abutment walls 13—14, and by operating hand wheel 26 the draft head may be readily laterally shifted in its arcuate guide for desired steering movement of the trailer, without increasing the hauling strain of the trailer load since the arcuate movement of the draft head is concentric with the pivotal mounting 7 of the trailer tongue.

When the draft head has been shifted so as to produce any desired steering movement, the hand wheel 26 is frictionally held by its latch 27 so as to lock the pinion and rack operating connection 21—22 and thereby hold the draft head against further lateral shifting, but the latch 27 is relieved of the major strain of said locking engagement, since the hauling strain upon head 11 tends to bind the same against one or the other of the fixed abutment walls 13—14, and thereby tends to bind the teeth of rack 22 with relation to the teeth of the meshing pinion 21. The draft head may thus be readily held at any desired arcuately adjusted position or as conveniently arcuately shifted, by the expenditure of but little manual energy.

I claim:

1. In combination, a draft vehicle, a trailer vehicle, a tongue, a pivotal mounting for the tongue on the trailer, a steering connection between the pivoted tongue and the trailer, a transverse arcuate guide on the draft vehicle, a concentric arcuate draft head slidable in said guide and secured to the pivoted tongue, the arc of said guide and head being concentric with the pivotal mounting for the tongue, a rack on the draft head, and a pinion meshing with the rack for arcuately shifting the draft head in the guide, the draft head being adapted to bind against its guide responsive to the strain of the trailer load with said binding engagement tending to bind the meshing engagement of the rack and pinion so as to releasably hold the draft head in any predetermined arcuately adjusted position.

2. A draft connection between a draft vehicle and the tongue of a trailer, comprising a transverse arcuate guide on the draft vehicle, a concentric arcuate draft head slidable in said guide and adapted to be secured to the trailer tongue, a rack on the arcuate draft head, and a pinion meshing with the rack for arcuately shifting the draft head in the guide, the pinion being journaled on the draft vehicle and fixed against displacement transversely of the draft vehicle.

3. A draft connection between a draft vehicle and the tongue of a trailer, comprising a transverse arcuate guide on the draft vehicle, a concentric arcuate draft head slidable in said guide and adapted to be secured to the trailer tongue, a rack on the arcuate draft head, and a pinion meshing with the rack for arcuately shifting the draft head in the guide, the draft head being adapted to bind against its guide responsive to the strain of the trailer load with said binding engagement tending to bind the meshing engagement of the rack and pinion so as to releasably hold the draft head in any predetermined adjusted position.

4. A draft connection between a draft vehicle and the tongue of a trailer, comprising a transverse arcuate guide on the draft vehicle, a draft head slidable in said guide and adapted to be secured to the trailer tongue, and a rack and pinion operating connection for arcuately shifting the draft head in the guide, the draft head being adapted to bind against its guide responsive to the strain of the trailer load with said binding engagement tending to bind the meshing engagement of the rack and pinion so as to releasably hold the draft head in any predetermined adjusted position.

5. A draft connection between a draft vehicle and the tongue of a trailer, comprising a transverse arcuate guide on the draft vehicle, a concentric arcuate draft head slidable in said guide and adapted to be secured to the trailer tongue, the draft head projecting laterally beyond the draft vehicle, a rack on said projecting end of the draft head, a pinion meshing with the rack for arcuately shifting the draft head in the guide, and an operating shaft for the pinion carried by and extending alongside the draft vehicle.

6. A draft connection between a draft vehicle and the tongue of a trailer, comprising a transverse arcuate guide mounted on the draft vehicle with its concave surface facing rearwardly toward the trailer, a concentric arcuate draft head secured to the trailer tongue and slidably engaging the guide, a rack on the arcuate draft head, and a pinion meshing with the rack for arcuately shifting the draft head relative to the guide, the pinion being journaled on the draft vehicle and fixed against displacement transversely of the draft vehicle.

7. A draft connection between a draft vehicle and the tongue of a trailer, comprising a transverse arcuate guide mounted on the draft vehicle with its concave surface facing rearwardly toward the trailer, a draft head secured to the trailer tongue and slidably engaging the guide, actuating means carried by the draft vehicle and fixed against displacement transversely thereof, and an operating connection between the actuating means and the draft head for arcuately shifting the draft head relative to the guide.

8. A draft connection between a draft vehicle and the tongue of a trailer, comprising a transverse arcuate guide on the draft vehicle, a draft head slidably engaging the guide and secured to the trailer tongue, actuating means carried by the draft vehicle and fixed against displacement transversely thereof, an operating connection between the actuating means and the draft head for arcuately shifting the draft head relative to the guide, and means for locking the draft head in arcuately adjusted position.

9. A draft connection between a draft vehicle and the tongue of a trailer, comprising a transverse arcuate guide on the draft vehicle, a draft head slidably engaging the guide and secured to the trailer tongue, actuating means carried by the draft vehicle and fixed against displacement transversely thereof, and an operating connection between the actuating means and the draft head for arcuately shifting the draft head relative to the guide.

10. A draft connection between a draft vehicle and the tongue of a trailer, comprising a transverse arcuate guide on the draft vehicle, a concentric arcuate draft head slidably engaging the guide and secured to the trailer tongue, a rack on the draft head, a pinion meshing with the rack for arcuately shifting the draft head relative to the guide, the pinion being journaled on the draft vehicle and fixed against displacement transversely of the draft vehicle, and means for locking the draft head in arcuately adjusted position.

In testimony whereof I have affixed my signature.

FRED MAINES.